United States Patent Office 2,845,911
Patented Aug. 5, 1958

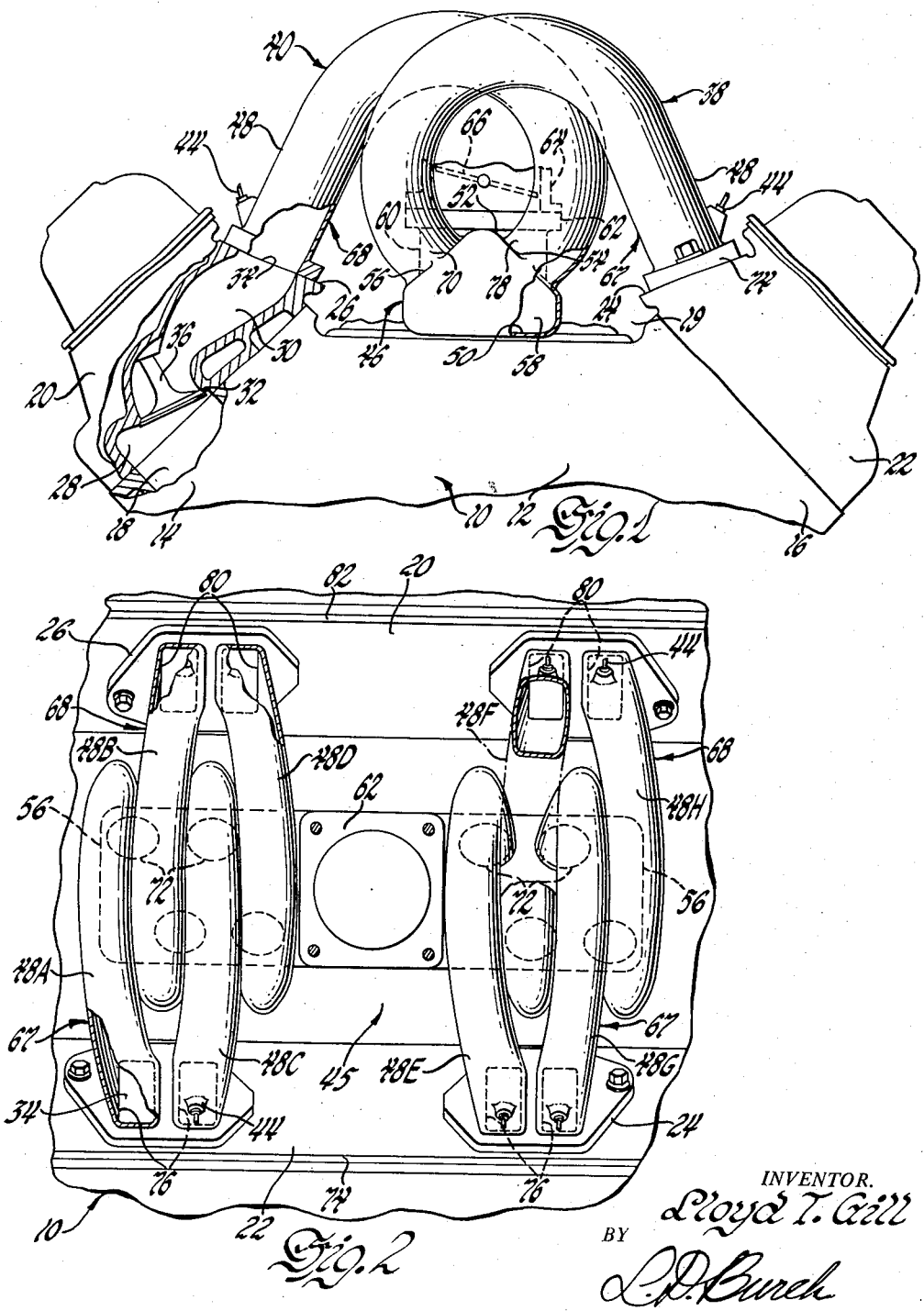

2,845,911

INDUCTION SYSTEM

Lloyd T. Gill, Lansing, Mich., assignor to General Motors Corporation, Detroit, Mich., a corporation of Delaware Application August 28, 1957, Serial No. 680,798

4 Claims. (Cl. 123—52)

The present invention relates to charge forming means for an internal combustion engine and, more particularly, to an induction system and intake manifold for such an engine that will insure a high volumetric efficiency in the charging of the engine cylinders.

To obtain the maximum performance and economy from an internal combustion engine of the multicylinder type, it is essential that the charges for all of the cylinders be substantially identical in all respects. In addition, the volume of the individual charges should be as large as possible. In the past, numerous attempts have been made to accomplish this objective by providing induction systems having intake manifolds wherein the induction passages are arranged in various configurations to facilitate the charging of the cylinders. Although the foregoing manifolds have produced acceptable results, the various induction passages present resistances to the flow of the charges therethrough. These resistances have materially limited the power developed by the engine. In order to overcome this resistance intake manifolds have been designed wherein the induction passages are "tuned" to have a length suitable for producing a ram effect during the charging cycle. In an engine such as employed in an automotive passenger car, in the range where maximum torque is desired, the engine speed is comparatively low; and as a result the ram pipes must have a considerable length in order to produce the ramming effect in the desired range.

It is now proposed to provide an induction system and charge forming means for an internal combustion engine having an intake manifold in which the various induction passages have a length suitable for producing a ram effect even though the speed of the engine is comparatively low. This is accomplished by providing a plenum chamber having throttled air therein and a separate ram pipe interconnecting each cylinder with the plenum chamber. In order to reduce the over-all height of the induction system, the plenum chamber is disposed over the camshaft gallery cover and the ram pipes extend upwardly from the chamber and spiral downwardly to be connected to the intake passages. The air throttling and metering mechanism are mounted on top of the plenum chamber so as to be nested in between the ram pipes.

In the drawings:

Figure 1 is a fragmentary end view of an engine employing an induction system embodying the present invention.

Figure 2 is a plan view of the manifold employed in the induction system of Figure 1.

Referring to the drawings in more detail, the present invention may be adapted to be employed on an internal combustion engine 10 of any suitable design. However, in the present instance it is particularly adapted for use on an internal combustion engine 10 of the so-called V-type. This engine 10 includes a cylinder block 12 having a pair of angularly disposed banks 14, 16 of cylinders 18 with an upwardly opening space 19 therebetween. A separate cylinder head 20, 22 is secured to each of these banks so that inclined plane faces 24, 26 on the sides thereof extend longitudinally along the opposite sides of the space 19. Separate cavities in the cylinder heads 20, 22 register with the open ends of the cylinders 18 to thereby form combustion chambers 28. Individual intake passages 30 for each of the cylinders 18 extend through the heads 20, 22 with the inner ends thereof forming intake valve seats 32 communicating with the combustion chambers 28 and the outer ends thereof forming intake ports 34 in the faces 24, 26. Intake valves 36 are disposed in each of these seats 32 and are actuated by the engine camshaft to time the flow of the charges into the cylinders 18.

In order to supply a combustible mixture of air and fuel for the cylinders 18, charge forming means 38 may be disposed above the space 19 between the two banks 14, 16 of cylinders 18. This charge forming means 38 includes an air induction system 40 and a fuel injection system such as disclosed in copending application Serial No. 591,889, filed June 18, 1956, in the name of John Dolza. This system includes means responsive to the fuel demands of the engine and effective to inject the metered fuel from the nozzles 44 and into the charge in proportion thereto.

The induction system 40 includes an intake manifold 45 having a main body 46 and a plurality of ram pipes 48. The body 46 is formed by a substantially flat horizontal floor 50 which is disposed immediately above the camshaft gallery cover. The top of the body is formed by an arcuate cover 52 having a pair of inclined plane portions 54, 56. The opposite ends of the body 46 are closed by end walls so as to form an airtight plenum chamber 58. An inlet duct 60 having a mounting flange 62 thereon projects upwardly from the center of the plenum chamber 58. A throttle body 64 having a throttle valve 66 therein may be mounted on this flange 62 to control the flow of air into the plenum chamber 58. In addition, any suitable air metering device such as a venturi may be provided on the throttle body 64 for developing a metering signal for controlling the fuel injection system. It may thus be seen that the body 46 encloses a plenum chamber 58 in which only throttled air is supplied to the center thereof.

The ram pipes 48 which carry the throttled air from the plenum chamber 58 to the cylinders are all preferably substantially identical to each other as to both their length and shape. The individual ram pipes 48 are designated 48A to 48H, inclusive, depending upon the cylinder which they serve and they may be broken down into two separate groups 67 and 68. One group 67 includes the ram pipes 48A, 48C, 48E and 48G which have the inlet ends 70 thereof secured to the plane portion 56 on the right side to open into the right side of the plenum chamber 58. These inlet ends 70 are flared to create a row of ports 72 along the flat portion 56. The ram pipes 48A, 48C, 48E and 48G extend upwardly from the plane portion 56 substantially normal to the plane thereof. The pipes then spiral over the top of the plenum chamber 58 and extend downwardly to be secured to a flat plate 74 and form a row of openings 76 therein. This plate 74 is adapted to be secured to the face 24 on the left head 20 and the openings are positioned to register with the inlet ports 34. The second group 68 of ram pipes 48B, 48D, 48F and 48H are shaped substantially identical to those in the first group 67. However, the inlet ends 78 thereof are connected to the flat portion 54 on the left side of the plenum chamber 58 substantially normal thereto. These pipes spiral over the top of the plenum chamber 58 so as to form a series of openings 80 in a plate 82 on the right side of the engine 10 so as to communicate directly with the inlet ports 34. It may be seen from Figure 2 that the ram pipes 48 are off-set longitudinally to correspond to the spacing of the engine cylinders 18 to thereby permit the ram pipes 48 to be interlaced with each other. In addition, the ram pipes 48 are placed to provide a clear space above the inlet 60 so that the throttle body 64 and air metering mechanism may project upwardly above the plenum chamber 58 and terminate at substantially the same height as the tops of the ram pipes 48. It will be noted that there is one set of ram pipes 48A, 48B, 48C and 48D on one end on one side of the inlet 60 and another set of ram pipes 48E, 48F, 48G and 48H on the other end on the other side of the inlet. Each set includes four ram pipes, i. e., two from each group 67, 68.

It may thus be seen that an induction system having an intake manifold with a plurality of ram pipes to produce a ramming effect during the charging of the engine cylinders has been provided. These ram pipes are all of substantially identical sizes and shapes. In addition, as a result of their upwardly spiraling and interlaced arrangement the over-all length of the ram pipes may be sufficiently long to produce the ramming effect at even low engine speeds without unduly increasing the height above the engine.

Various changes and modifications of the embodiment of the invention described herein may be made by those skilled in the art without departing from the spirit and principles of the invention.

I claim:

1. Charge forming means for a multicylinder engine having a pair of angularly disposed banks of cylinders comprising an intake manifold having a plenum chamber adapted to extend longitudinally of said engine, a first group of ram pipes extending upwardly from the top of said chamber to interconnect said chamber with the cylinders in one of said banks, a second group of ram pipes interconnecting said chamber with the cylinders in the other of said banks, an inlet projecting from the center of said chamber at substantially right angles thereto and adapted to have a throttle body mounted thereon so as to project between said ram pipes.

2. Charge forming means for a multicylinder engine having a pair of angularly disposed banks of cylinders comprising an intake manifold having a plenum chamber adapted to extend longitudinally of said engine, an inlet into the center of said chamber projecting normal thereto, a first set of ram pipes communicating with one end of said chamber for interconnecting said chamber with the cylinders on the corresponding end of said engine, the ram pipes for the cylinders in one bank extending upwardly from the chamber, a second set of ram pipes interconnecting the opposite end of said chamber with the cylinders on the opposite end of said engine, the ram pipes for the cylinders in said last mentioned bank extending upwardly from said chamber.

3. Charge forming means for an internal combustion engine having a pair of angularly disposed banks of cylinders comprising an intake manifold having a plenum chamber adapted to be disposed between said banks of said cylinders so as to extend longitudinally of said engine, a first group of ram pipes forming a longitudinal row of ports along the top of one side of said chamber, said ram pipes interconnecting said chamber with the cylinders in the bank on the side opposite from said ports, a second group of ram pipes forming a second longitudinal row of ports along the top of said chamber on said opposite side, said second group of ram pipes interconnecting said chamber with the cylinders in the other of said banks, a vertical inlet projecting upwardly from the center of said chamber so as to have a throttle body mounted thereon between said ram pipes.

4. Charge forming means for an internal combustion engine having a pair of angularly disposed banks of cylinders comprising an intake manifold having a plenum chamber adapted to be disposed between said banks of cylinders so as to extend longitudinally of said engine, a vertical inlet projecting upwardly from the center of said chamber so as to have a throttle body mounted thereon, a first set of ram pipes projecting upwardly from one end of said chamber, a second set of ram pipes projecting upwardly from the opposite end of said plenum chamber, each of said sets including a pair of ram pipes connecting one side of said chamber with the cylinders in the bank opposite thereto and a second pair of ram pipes interconnecting the other side of said plenum chamber with the cylinders in the other of said banks.

No references cited.